May 10, 1966     G. I. DOERING     3,250,122
METHOD OF DETERMINING INTERFACE LEVEL IN TANKAGE OF MATERIALS
Filed Sept. 10, 1963
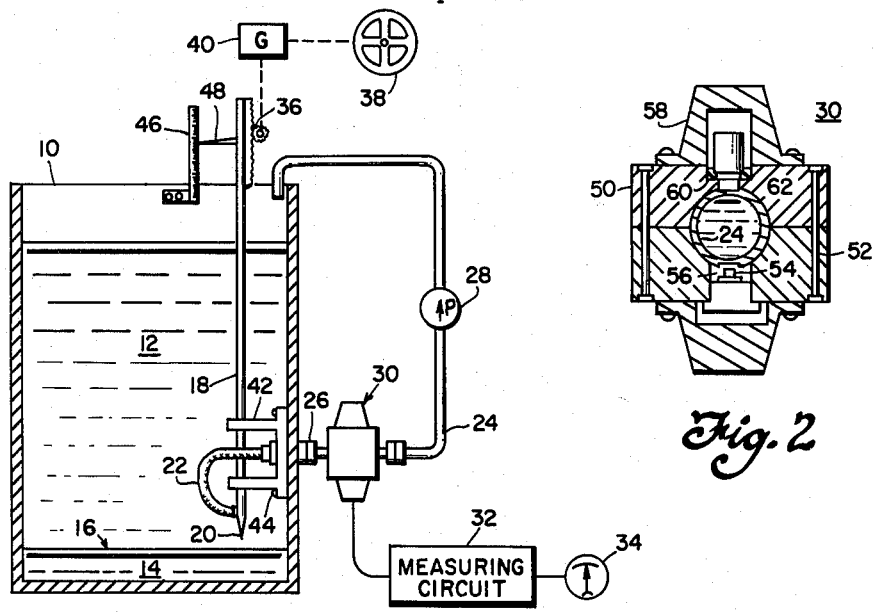
Fig. 1
Fig. 2
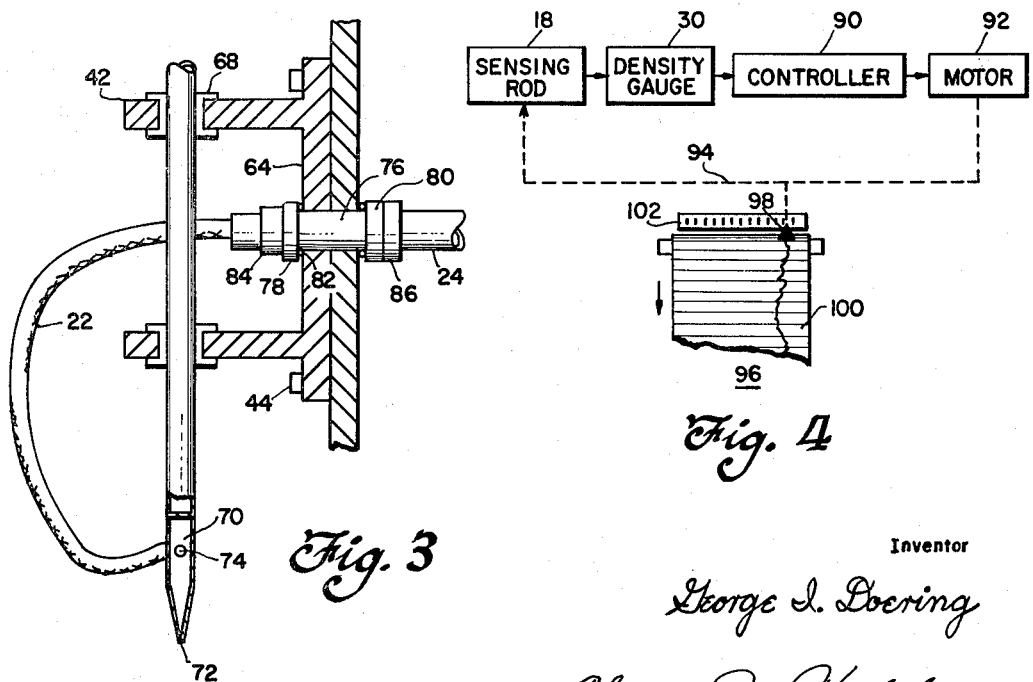
Fig. 3
Fig. 4
Inventor
George I. Doering
By Charles M. Hutchins
ATTORNEY

൧

3,250,122
METHOD OF DETERMINING INTERFACE LEVEL IN TANKAGE OF MATERIALS
George I. Doering, Columbus, Ohio, assignor to Industrial Nucleonics Corporation, a corporation of Ohio
Filed Sept. 10, 1963, Ser. No. 307,885
7 Claims. (Cl. 73—298)

This invention relates to fill height gauges and more particularly to a novel method and means for determining the location of the interface between two fluids.

In many instances, it is necessary to determine the position of an interface between two contiguous fluids. It may be desirable to maintain the interface at a predetermined level in the containing vessel. In some instances, it may be desired to remove the lower fluid by means of pumping apparatus communicating with the vessel. This would be the case where petroleum products are stored in large tanks. Water accumulates and settles to the bottom forming an interface due to the immiscibility of the two fluids. In other applications where highly reactive products are to be stored, it is desirable to maintain a certain minimum protective covering layer of non-oxidizable substance as a safeguard against combustion.

Usually the fluids are stored in opaque vessels, making visual observation of interface level impossible. Other non-contacting devices have been used but they are mechanically awkward in operation and they suffer from many inaccuracies. For example, radiation source-detector units have been slidably mounted on the outside of the vessel and adapted to detect radiation transmitted through the vessel wall and reflected off the liquid interface. The position of the unit is varied until an output signal is produced, whereupon the position of the source-detector unit is indicative of the interface location. Positional inaccuracies result not only from slop due to wear of the gearing mechanism but also from radiation scattered back into the detector by the fluids themselves.

Various contacting gauges have been built, many of these devices employ a mechanical linkage extending through the wall of the vessel and hence are subject to leaks through the openings in the vessel necessary to accommodate such linkage. Others use a float adapted to ride at the interface and means used to sense the position of the float. Reference may be had to U.S. Letters Patent No. 2,660,059, issued to M. R. Dean et al. which describes an electromagnetic sensor comprising a coil around a standpipe carrying a magnetizable float riding in the pipe at the fluid interface. Since the float must be a specified minimum size to induce a sizeable voltage in the pickup coil, the resolution of the system must necessarily deteriorate. In addition, the coil assembly must be mechanically positioned on the standpipe by a lead screw and gearing arrangement and hence suffers from the same disadvantages as the non-contacting system described above.

The present invention senses the change in fluid density or composition which occurs at the interface by means of a rigid lightweight sampling probe or rod inserted vertically in the tank. The rod is used both to extract liquid through its lowermost end and to serve as a level indicator at its uppermost end. The upper end of the rod cooperates with a fixed scale and functions in a manner somewhat analogous to a hydrometer. The extracted liquid is pumped through a radiation gauge located outside the vessel and back into the vessel or into a supply conduit. The rod is positioned until the measured density of the extracted fluid changes radically. Whereupon the lower tip of the rod is located substantially at the interface and the scale may be read.

Accordingly, it is a primary object of the present invention to provide a novel system for determining the level of the interface between two immiscible liquids of different density.

It is another object of the present invention to provide an interface level gauge which is simple to construct, has a minimum of mechanical moving parts subject to wear and is readily mounted on storage vessels already in existence.

It is yet another object of the present invention to provide an interface level gauge which requires neither constant maintenance nor technically skilled personnel for its operation.

Briefly stated, the present invention determines interface level by measuring the density of the stored liquid at various depths below the surface thereof with a sampling probe and automatically indicating the sampling depth when a jump discontinuity in measured density is recorded.

The above objects, as well as numerous other advantages and features of the present invention, will become more apparent upon reference to the following description when taken in conjunction with the accompanying drawings, in which:

FIG. 1 is a diagrammatic view, partly in section, of an interface level indicating system constructed in accordance with the present invention;

FIG. 2 is an enlarged partial view in section of a preferred density transducer useful in the system shown in FIG. 1;

FIG. 3 is a partial sectional view showing mechanical mounting apparatus used in the system shown in FIG. 1; and FIG. 4 is a diagrammatic view of an automatic tank interface level indicating system.

With reference to the drawings, in FIG. 1 a tank 10 is shown for storing two immiscible fluids 12 and 14 having different densities. The fluids which may be oil and water respectively form an interface 16 usually located somewhere near the bottom of the tank 10. The gradual accumulation of water causes the level of the interface 16 to rise. When the amount of water becomes excessive, it is required to drain some off through valve means (not shown) located near the bottom of the tank.

To determine the location of the interface 16, the present invention provides a sampling rod 18 having an intake nozzle 20 at the lowermost end thereof. A flexible conduit 22 connects the nozzle to an external conduit 24 by means of a through-coupling 26. Pump 28 serves to force fluid through the conduit 24 and back into the tank 10 past a density gauge 30 which is connected to a measuring circuit 32 and indicating meter 34.

In the system of the present invention, the rod is moved downward until a discontinuity in density is detected by the gauge 30. In the embodiment shown in FIG. 1, the vertical position of the rod 18 is adjusted by means of a rack-and-pinion gear arrangement 36 connected to a hand crank 38 by means of a gear reducer indicated schematically at 40. The rod 18 is adapted to be slidably supported by a U-shaped bracket 42 fabricated to carry the coupling 26 and fastened to the wall of the tank by bolts 44. The rod itself may be used as a position indicator, using for example, a fixed scale 46 suitably calibrated and a pointer 48 fastened to the sampling rod 18. Alternatively, a scale can be provided on the rod and a cursor means may be mounted on the tank wall. In some instances, it may be more suitable to use a vernier dial driven by the gear reducer 40.

In the operation of the present invention, the rod is lowered into the tank and the meter 34 continuously reads out the density of the sampled fluid flowing in the conduit 24. As soon as the tip of the rod 18 engages the interface 16 a significant change in measured density occurs and is immediately registered on the meter 34. The operator stops the rod and the interface level is read directly off the scale 46. The accuracy of measurement is dependent on the ability of both the nozzle and the density gauge to resolve the interface 16. The flow rate of the pump 28 should be adjusted so that the transport time of the fluid from nozzle to gauge is short. If the transport time becomes excessive, the rod may be positioned beyond the interface before a change in density is observed. However, should the flow rate be too great, turbulence may develop in the fluid near the intake, thereby creating a localized disturbance of the interface level.

While the density gauge 30 may be any mechanical or electromechanical means known in the density transducer art, it is preferred to employ a radiation density gauge as illustrated in FIG. 2. Referring now to FIG. 2, the gauge 30 comprises a substantially cubical housing fabricated in two pieces and clamped around the conduit 24 by means of bolts 52. A source of radiation 54 is mounted in a recess 56 in the lower portion and an ionization chamber 58 is insulatively mounted on an annular step 60 located in a recess 62. The conduit is milled out adjacent to the source and detector members to reduce attenuation of radiation passing therebetween, thereby increasing the sensitivity of the measuring system. Other advantages of this density transducer include physical compactness and non-interference with the sampling flow. A measuring circuit useful in conjunction with the preferred transducer may be that shown and described in U.S. Patent No. 2,790,945 issued April 30, 1957 to H.R. Chope and assigned to the same assignee as the present invention.

Having illustrated the construction of a preferred density gauge, it is instructive to investigate a suitable mechanical construction used to mount the sampling rod 18. In the construction shown in FIG. 3, a U-shaped bracket 64 is bolted to the tank wall 66. A bearing member 68 is provided in vertically aligned holes bored in the arms of the bracket 64 to slidably engage the sampling rod 18. The bearing 68 may be constructed of a suitable plastic material, for example that sold under the name Teflon, or other non-corrosive material. The lower end of the rod 18 includes a hollow intake chamber 70 having an inlet 72 and an outlet 74. A short interconnecting pipe 76 is passed through the bracket 64 and tank wall 66 and clamped by the flange fittings 78, 80 screwed on both ends of the pipe. O-ring seals, as shown at 82, may be used to prevent leakage of stored liquid. A screw on fitting 84 connects the flexible hose 22 to the short pipe 76. Another flange 86 integral with the conduit 24 is bolted to the fitting 80.

While the system described above operates in a manner sufficiently effective for most applications, it may be desirable to use an automatic sensing and readout system such as shown schematically in FIG. 4. Referring to FIG. 4, the output of the density gauge is coupled to a controller unit 90 which drives a servomotor 92. The servomotor is mechanically connected to the sensing rod 18 as indicated by the dotted line 94. The controller 90 and motor 92 may be constructed in a manner similar to that suggested in U.S. Patent 2,895,888 issued July 21, 1959 to D. E. Varner. In this embodiment, the rod is automatically positioned at the interface by the motor 92 and its position may be read out on a chart recorder 96 having a marking indicator 98 displaceable across a movable chart 100. A scale 102 may be calibrated in units of tank depth.

In briefly reviewing the advantages of the present invention, it is important to emphasize the ability of the system of the present invention to resolve the interface between two fluids whose density and composition may be quite similar. In addition, it is apparent that the power required to position the light-weight sampling rod is several orders of magnitude below that necessary to operate prior art devices performing a related function.

Although certain specific embodiments of the invention have been shown and described herein, many modifications may be made thereto without departing from the true spirit and scope of the invention as set forth in the appended claims.

I claim:
1. Apparatus for determining the level of the interface of two immiscible fluids stored in a vessel comprising means for removing a continuous sample of said stored fluid from progressively different depths below the surface of said vessel, means for measuring the density of said removed sample, and means for indicating the depth of said sampling whenever the measured density of said sample fluid changes.

2. Apparatus, as described in claim 1, wherein said means for removing said sample has means for continuously returning said sample to said vessel after being measured.

3. Apparatus, as described in claim 1, wherein said measuring means comprises a radiation density gauge arranged to continuously indicate the density of said sample and wherein said means for removing said sample has means for continuously returning said sample to said vessel.

4. The method of determining the level of one or more interfaces between materials of different density stored in a vessel, said method comprising the steps of:
  measuring the density of said stored materials at different depths within said vessel, and
  indicating the depth at which said measured density changes.

5. Apparatus for determining the level of the interface between two media of different density contained in a vessel comprising scale means fixedly mounted on said vessel, an adjustable tube mounted inside said vessel and having a lower portion forming an intake pipe and an upper portion cooperating with said scale means, conduit means forming an extension of said intake pipe and extending outside of said vessel, pump means for transporting media through said conduit means, gauge means mounted in said conduit to provide a signal indicative of the density of said transported media, drive means for actuating said tube adjustment, and control means responsive to said density indicative signal for energizing said drive means until a substantial change in said signal occurs.

6. Apparatus for determining the position of the interface between two media of different density contained in a vessel comprising a sampling tube having an open lower end forming an intake, means for adjustably positioning said tube in said media, conduit means communicating with said intake and extending outside said vessel, pump means connected to said conduit means for continuously circulating said media through said sampling tube intake, gauge means in said conduit for measuring the density of circulated media, indicator means connected to said gauge for reading out said media density, control means for adjusting the position of said sampling tube until a substantial change in said density is registered by said indicator means, and means for indicating said sampling tube position associated with said substantial change in density.

7. Apparatus for determining the position of the interface between two media of different density contained in a vessel comprising a sampling tube having an open lower end forming an intake, means for adjustably positioning said tube in said media, conduit means communicating with said intake and extending outside said vessel, pump means connected to said conduit means for continuously circulating said media through said sampling tube intake and back to said vessel, gauge means in said conduit for measuring the density of circulated media, indicator means connected to said gauge means for reading out said media density, automatic control means responsive to said measured density for continuously positioning said intake of said sampling tube at said interface, and means for indicating said sampling tube position in said vessel.

References Cited by the Examiner

UNITED STATES PATENTS

| 2,617,302 | 11/1952 | Massiot | 73—298 |
| 3,106,841 | 10/1963 | Brandel et al. | 73—32 X |
| 3,164,991 | 1/1965 | Potthoff et al. | 73—299 X |

FOREIGN PATENTS 732,746  3/1943  Germany.

ISAAC LISANN, *Primary Examiner.*